(12) United States Patent
Caporaso (10) Patent No.: US 12,071,110 B2
(45) Date of Patent: Aug. 27, 2024

(54) METHOD AND SYSTEM FOR AUTOMOBILE CLEANING

(71) Applicant: Gliptone, Inc., Ronkonkoma, NY (US)

(72) Inventor: Rocco Caporaso, Nesconset, NY (US)

(73) Assignee: Gliptone, Inc., Ronkonkoma, NY (US)

( * ) Notice: Subject to any disclaimer, the term of this patent is extended or adjusted under 35 U.S.C. 154(b) by 349 days.

(21) Appl. No.: 17/691,236

(22) Filed: Mar. 10, 2022

(65) Prior Publication Data

US 2022/0289149 A1    Sep. 15, 2022

Related U.S. Application Data

(60) Provisional application No. 63/159,337, filed on Mar. 10, 2021.

(51) Int. Cl.
*B60S 3/04* (2006.01)
*B08B 3/08* (2006.01)

(52) U.S. Cl.
CPC .............. *B60S 3/045* (2013.01); *B08B 3/08* (2013.01); *B60S 3/042* (2013.01)

(58) Field of Classification Search
CPC ...................................................... B60S 3/045
See application file for complete search history.

(56) References Cited

U.S. PATENT DOCUMENTS

2002/0002989 A1* 1/2002 Jones ................ B60S 3/04
134/123

* cited by examiner

*Primary Examiner* — Jason Y Ko
(74) *Attorney, Agent, or Firm* — Schott, P.C.

(57) ABSTRACT

A 5-step system of washing a vehicle that will yield substantially contamination-free surfaces. To yield the desired results, each step uses a product formulation that incorporates matching color-coordinated wash buckets and microfiber wash mitts to prevent cross-contamination or neutralization of chemicals, which could render them less effective and jeopardize our ability to achieve optimum results. Each step incorporates a formula that attacks and eliminates a specific range of soil types, such as: Hydrocarbon film, grease, brake dust, hard water mineral deposits, bug and tar residue, tree sap, dried paint overspray, etc.

17 Claims, 6 Drawing Sheets

STEP 1. PRECISION CLENZ TIRE & RIM
(Dilution 15:1 to 20:1)

A. Apply diluted Precision Clenz Tire & Rim to: tires, rims, fender wells, lower panels & bumpers.

B. No extended dwell time or scrubbing required: However if surfaces are heavily soiled, use a #43 PL brush to lightly scrub wheels/rims and a black Softouch wash pad (GT17000) to lightly scrub bumpers and lower panels. Use dedicated black bucket (GT17050) to rinse pads periodically.

C. High pressure rinse entire vehicle with extra attention to tires, rims, fender wells & bumpers.

KEY OBJECTIVES

1. Removes the heaviest soils and grime from tires, rims/Wheels and lower panels. Any remaining traces of brake dust will be removed in Step 3.

2. Save time by using this opportunity to give the car it's initial high pressure water rinse.

Scan for Step 1 Video

Scan for SDS Sheet

ESTIMATE TIME: 10-15 minutes.    IF 1 TECH   OR    IF 2 TECH   SAFETY

TARGETED CONTAMINANTS: Dirt, oil grime, road tar and brake dust.

FIG. 2

STEP 2. PRECISION CLENZ HIGH pH Prep Wash
( Dilution 60:1 to 120:1 ) = 1 oz. (25ml) to 2 oz. (50ml) per car A. Predilute 4 oz. (100 ml) Precision Clenz High pH (GT43701) to 32 oz. (946ml) water. This equates to approximately 10:1 predilution. Fill Gliptone's 'Blizzard Maker' / Foam Cannon (GT44400) cannister or alternative pump sprayer with diluted mixture.
B. Foam or spray onto car side-to-side, from bottom to top. Be sure car is completely covered. Allow formula to dwell 2-3 minutes on surface.
C. Using two clean designated blue Softouch® wash pads (GT43700) gently massage dense foam into vehicle surfaces (paint, glass, plastic & metal trim). Rinse pads periodically between sections in dedicated blue bucket (GT43750).
D. Rinse thoroughly from top down. Note: It is not necessary to dry the car prior to moving onto the next step.

KEY OBJECTIVES

Car has been made visually clean with no remaining deposits of dirt and grime.

NOTE: Pollutants such as: ferrous metal-based particles, akaline water and hard water mineral stains/spotting and paint overspray, etc. will remain bonded to the surface. These contaminants will be completely removed later on in the process.

ESTIMATE TIME: 15 IF 1 TECH OR 10 IF 2 TECH
10-15 minutes.

TARGETED CONTAMINANTS: Grease, road film and hydrocarbon pollutants from industrial and car/truck exhaust; also gummy/grimy residue such as fresh or hardened tree sap, bird droppings and bug residue.

Scan for Step 2 Video    Scan for SDS Sheet

SAFETY

FIG. 3

STEP 3. IRON EATER (Rims & Paint)

A. Spray a heavy layer of undiluted IRON EATER (CTI6901) on four rims and all painted surface areas of the vehicle, using a slow and focused application. Start with the passenger front rim & quarter panel moving clockwise around the vehicle. Be sure application completely covers all painted surfaces and rims including the inside (back) surface of the rims.

B. Allow to dwell 2-3 minutes after completing the application

C. Use the designated purple bucket (C16950) & Wheel Wool (CT92005) brushes, gently scrub all four rims starting with the same passenger front rim. Use the Wheel Wool Lug & Caliper brushes to reach into and behind all rim surfaces. Using the designated Softouch® purple wash pads (CTI6900), gently scrub the entire vehicle including all painted, glass and plastic trim surfaces.

NOTE: Do not allow IRON EATER (GT16901) to remain dry on any surfaces (especially glass and plastic) for more than 10 minutes. Depending on weather conditions IRON EATER remains wet on most surfaces for 10-15 minutes leaving enough time for a 2-technician team to complete the process. If working as a single technician, apply and remove only half the vehicle at a time.

SMELL WARNING!: Iron Eater® is ph neutral and extremely safe to use. It's strong odor comes from a key active ingredient. This makes the product turn color and dissolves the iron particles. Be warned, Iron Eate will probably be the worst smelling product in your detailing arsenal!

KEY OBJECTIVES
Removes ferrous metal-based particles that could otherwise scratch the vehicle surface if approached with clay bars or clay mitts prior to this phase.

ESTIMATE TIME: 30 IF 1 TECH OR 15 IF 2 TECHS 15-35 minutes.

TARGETED CONTAMINANTS: Ferrous metal based particles and pollutants bonded to the rims, paint, plastic and glass surfaces.

Scan for Step 3 Video    Scan for SDS Sheet

| STEP 4. PRECISION CLENZ LOW pH Prep Wash |
| --- |
| ( Dilution 60:1 to 120:1 ) = 1 oz. (25ml) to 2 oz. (50ml) per car |

A. Predilute 4 oz. (100 ml) Precision Clenz Low pH (GT42201) to 32 oz. (946ml) water. This equates to approximately 10:1 predilution. Fill Gliptone's 'Blizzard Maker' / Foam Cannon (GT44400) cannister or alternative pump sprayer with dilute mixture.
B. Foam or spray onto car side-to-side. from bottom to top. Be sure car is completely covered, including rims and wheels. Allow formula to dwell 2-3 minutes on surface.
C. Using two clean designated yellow Softouch wash pads (GT42200) gently massage dense foam into vehicle surfaces (paint, glass, plastic & metal trim). Use dedicated yellow bucket (GT42250) to rinse pads periodically.
D. Rinse thoroughly from top down. NOTE: It is not necessary to dry the car prior to moving onto the next step.

148
142
146
144

| KEY OBJECTIVES |
| --- |
| 1. Removes all of the remaining mineral deposit residue from glass and painted surfaces.<br>2. Removes the alkaline chemical film residue deposited over time from wash chemicals and untreated rinse waters.<br>ESTIMATE TIME: [15] IF 1 TECH OR [10] IF 2 TECH<br>10-15 minutes.<br>TARGETED CONTAMINANTS: Hard water mineral deposits, scale, rust and detergent film build up. |

Scan for Step 4 Video 
Scan for SDS Sheet 
SAFETY

| STEP 5. BODY BAR CLAY PROCESS |
|---|
| A. By misting Body lube (CT72201) on to an already wet vehicle you are conserving product creating a more slippery surface for the Gliptone Body Bar(GT71220), Body Prep Mitt(GT71286) or Body Prep Disc(GT71270) to glide on. NOTE: Body lube contains no silicones or film forming materials so at the conclusion of this step the paint is clean and prepared for whatever direction the technician intends to take with the paint including: compounding, polishing, waxing. CT Quartz ceramic coating or enhanced spray treatment using Glipguard'(GT2801) or Glipgloss(GT2601).<br>B. Move around the vehicle slowly and methodically focusing on all glass and painted surfaces, only moving on once all surfaces are smooth and free of contimination. |

158
152
154 Optional Body Prep Mitt Fine GT71286
Gliptone Body Clay Bar
157  156
Optional Body Prep Disc Medium GT71270

| KEY OBJECTIVES | |
|---|---|
| Remove any remaining 'above-the-surface' particles such as paint overspray and various other non-ferrous metal based particulates.<br>NOTE: All 'ferrous metal' based pollutants and contaminents will already have been removed during the IRON EATER and PRECISION CLENZ low pH phases. | Scan for Step 5 Video     Scan for SDS Sheet  |
| ESTIMATE TIME: 10-30 minutes.    20 - 30 IF 1 TECH    OR    10 - 15 IF 2 TECHS | |
| TARGETED CONTAMINANTS: Bonded remaining particles such as paint overspray and hardened bits of non-metallic based particles. | |

FIG. 6

METHOD AND SYSTEM FOR AUTOMOBILE CLEANING

BACKGROUND

The inventor has produced wash systems that incorporate the use of both Low pH and High pH detergents as well as other steps, used a sequence of either one or the other first, in an effort to eliminate the widest possible range of soil residual. Sometimes this 2-step wash chemistry also incorporates a pH neutral wash cycle or rinse. The use of this High pH/Low pH combination was first introduced into the car wash industry back in the early 1990s when the touch-free car wash concept was being introduced to the market.

Touch-free washing can prove challenging in an automated wash process because many soils, such as hydrocarbon film, which is bonded like a greasy film on the substrate, is difficult to remove without the use of friction, brushes, or chamois miters. Additionally, mineral deposits from hard water that sometimes forms an eyebrow-looking haze on windshields, is hard to remove with high pH chemistry but can effectively be removed with an acidic, Low pH detergent.

Labor expense in a full-service car wash represents the operators' greatest overall expense, more than the chemicals, materials, water, or electricity. A large part of that labor expense is dedicated to the human staff drying the car at the end of the wash cycle.

Arguably, the stronger and/or greater the acidic content of a low pH detergent, the more effective it is. Because most of these formulas are too harsh for contact with human skin, however, they tend to remain strictly in the automated car wash industry and do not cross over into the hand-washing or detailing industry.

The hand washing, polishing, or detailing industry tends to be more detail-oriented. The consumer expects the wash and polish process to be slower and more expensive, but with improved results over an automated wash. Unlike the automated car wash that has a profitability largely determined by how many cars it can wash in the shortest amount of time, the detailing industry caters to the car enthusiast and strives for flawless perfection. Within this industry there are advanced methods of decontamination wash including the options list that follows, which have never been performed or promoted within the same process. It is worth noting that most of these businesses would NOT go through the trouble of implementing a time-consuming, decontamination wash process unless the car was showing visible signs of contamination buildup. Examples of which would be either paint overspray where the overspray can actually be felt by dragging your clean hand gently over the paint surface, or in some extreme cases, you can actually see the paint overspray if for example its dark colored paint that has landed and dried onto a white colored car, and finally, rust spots. These appear as tiny orange particle specs. They are ferrous metal-based particles sometimes referred to as rail dust or industrial fallout that are exposed to the elements and starting to rust . . . hence the orange coloration. There are many sources of this type of contamination including actual brake dust from a train (mostly affects new cars transported by rail or commuter cars parked at train stations); Brake dust from cars and truck, especially in severe cases of deteriorated brakes where the brake pads have completely deteriorated and calipers are digging into rotors.

Body Claying Process: This includes hand washing with pH Neural soap then following the body claying process explained below. This process targets 100% of the above the surface contaminants.

Chemical fallout remover acid solution: This chemistry and process is typically used as a remedy for the orange rust spot phenomenon referred to earlier. Most fallout removers contain oxalic acid. The solution is either diluted, or not, depending on the concentration, then carefully applied to the surface of the car, and allowed to dwell for an extended, prescribed period.

Chemical fallout remover using a mild, ammonia emitting, relatively pH neutral-acid solution, produced by inventor under the name, IRON EATER®: More recently (5 years), this chemistry and process can also be used, as a remedy for the orange rust spot phenomenon. Most iron cleaner-type formulas contain a substantially similar blend of an ammonia-producing mild acid solution. The formula is pH Neutral and represents a far safer, and more effective alternative to harsher, acid-based solutions. The solution is either diluted, or not, depending on the concentration, then carefully applied to the surface of the car, and allowed to dwell for an extended, prescribed period.

This deep cleansing, decontamination wash process was created in response to a growing trend of ceramic coating cars. This step of coating cars incorporates forming a SiO2 bond with the surface, and the simple explanation is that the phrase "ceramic coating" refers to a more technologically advanced method of protecting a vehicle's finish verses that of traditional methods of car waxes and paint sealants.

Both car waxes and paint sealants add a layer of protection to a cars paint surface that may remain in place for 1 to 10 months on average, depending on several variables such as: quality of the wax or sealant, driving frequency/mileage, environment (i.e. sun, heat, acid or alkaline rain, hard mineral rich or treated ground water, salt air, sand, storms, volcanic ash, bird droppings, pine tar, tree sap, pollen, bug residue, etc.), frequency of washings, concentration of detergents contained in the wash chemicals, storage practices (i.e. garaged or not), etc.

In the case of a ceramic coating, the protective layer forms a permanent, covalent bond with the vehicle's paint surface, almost like bonding a piece of glass or crystal to the surface. The top surface of the coating may eventually scratch or scuff, but its base remains bonded to the surface. Incidentally, the top surface is so hard that the degree of scratching is significantly reduced and the coating acts as a magnifier, highlighting and increasing the paints depth of gloss. In preparation for the application of the ceramic coating, the car may be thoroughly cleansed/decontaminated, then paint-corrected (compounded, polished and swirl removed) properly, because if not, the ceramic coating process permanently locks in the impurities, which detracts from the flawless finish that every coating application center strives to achieve.

SUMMARY OF THE EMBODIMENTS

A comprehensive system of washing a vehicle described herein that yields nearly contamination-free surfaces. To yield the desired results, each step uses a product formulation, in a specific sequence, that incorporates matching color-coordinated wash buckets and microfiber wash mitts/cloths to prevent cross-contamination or neutralization of chemicals that could render them less effective and jeopardize optimum results. Each step incorporates a formula that attacks and eliminates a specific range of soil types, such as:

hydrocarbon film, grease, brake dust, hard water mineral deposits, bug and tar residue, tree sap, dried paint overspray, etc.

DETAILED DESCRIPTION OF THE EMBODIMENTS

After almost two years of research and testing, the inventors concluded that the process described herein yielded the most contaminant-free surface possible. To make this system as complete and efficient as possible, significantly reducing the possibility for error by way of cross contamination, the inventors incorporated the color coded, matching color bucket and wash mitt, cloths, or even brush concept to minimize the chance of cross contamination of materials. Incidentally, efforts were made to have each bucket that will be used for a particular product in the process, colored as it is commonly recognized on a pH chart. For example: Yellow for a low pH, acidic product precision cleanse low pH detergent, and blue for the precision cleanse high pH detergent.

The process may contain both required features that are essential to the functionality and effectiveness of the system/process, and optional features that have been incorporated to contribute to the overall speed, efficiency and effectiveness of the process.

Figure 1:
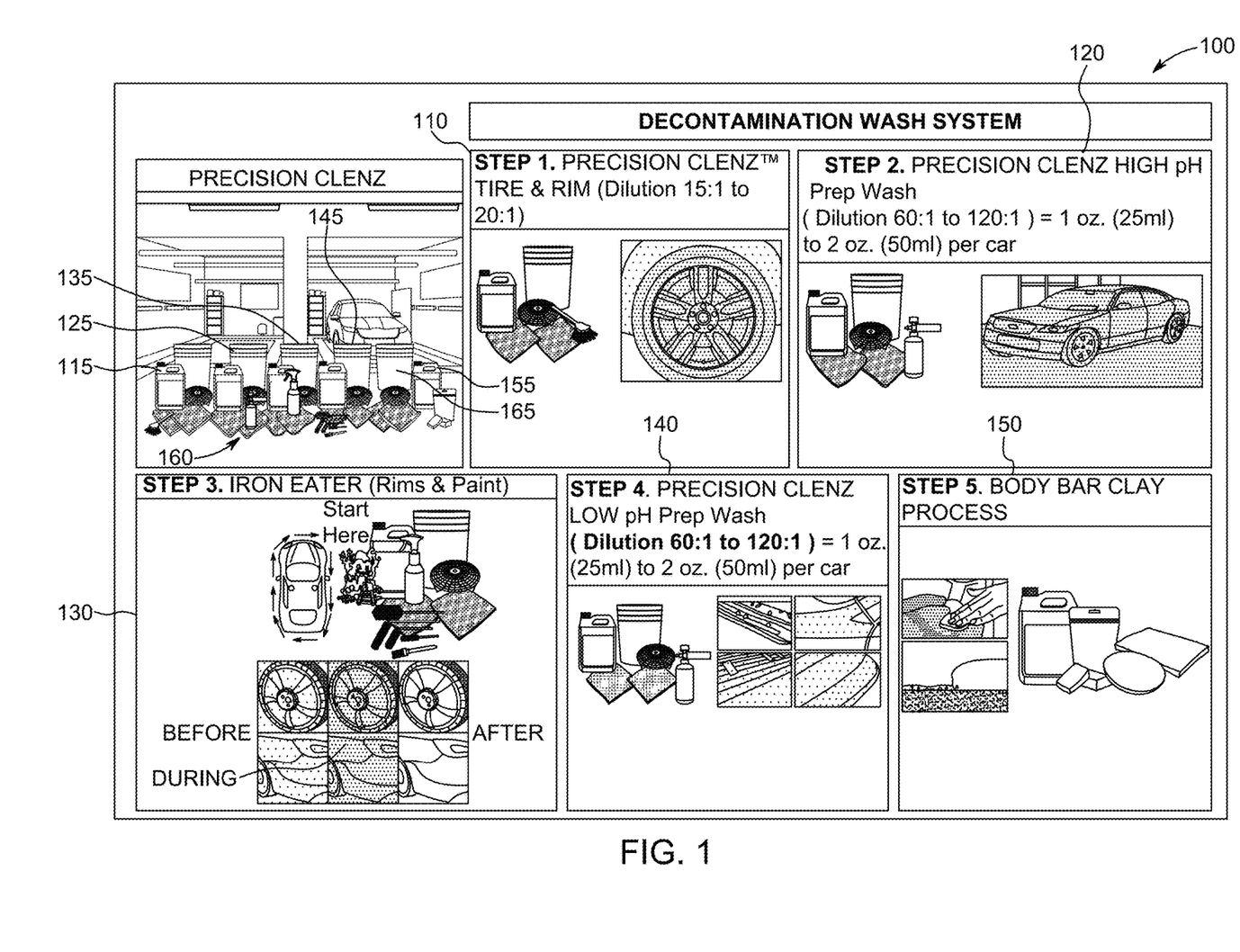
FIG. 1 shows an overview of the process and products described herein.

The steps along with their Required features and Optional features are as follows and summarized in the System 100 in FIG. 1. Each of the steps are shown in more detail in FIGS. 2-6. Detail for the neutral cleans step 165 are not shown in detail but merely described.

STEP 1: Precision Cleanse Tire and Rim 110 (using a high pH, NaOH-based detergent that incorporates a blend of chelate and surfactant to serve the function of cleaning the tire)—see FIG. 2. The function of cleaning the tires and rims from the standpoint of eliminating grease, grime, dirt and road film from tires and rims may be required and addressed before Step 3 that incorporates the iron cleaner to remove ferrous-metal-based brake dust contamination that has accumulated on the front and rear surfaces of the rim and caliper surfaces. The optional aspect of this step is not whether it takes place, rather it's an option as to whether it gets merged in with Step 2 high pH cleansing 120 of the vehicle. Theoretically, the soils targeted in step 1 could be merged into step 2 since the chemistries of precision cleanse tire and rim are compatible with precision cleanse high pH prep wash detergent. This may be an option for new or very clean cars.

Figure 2:
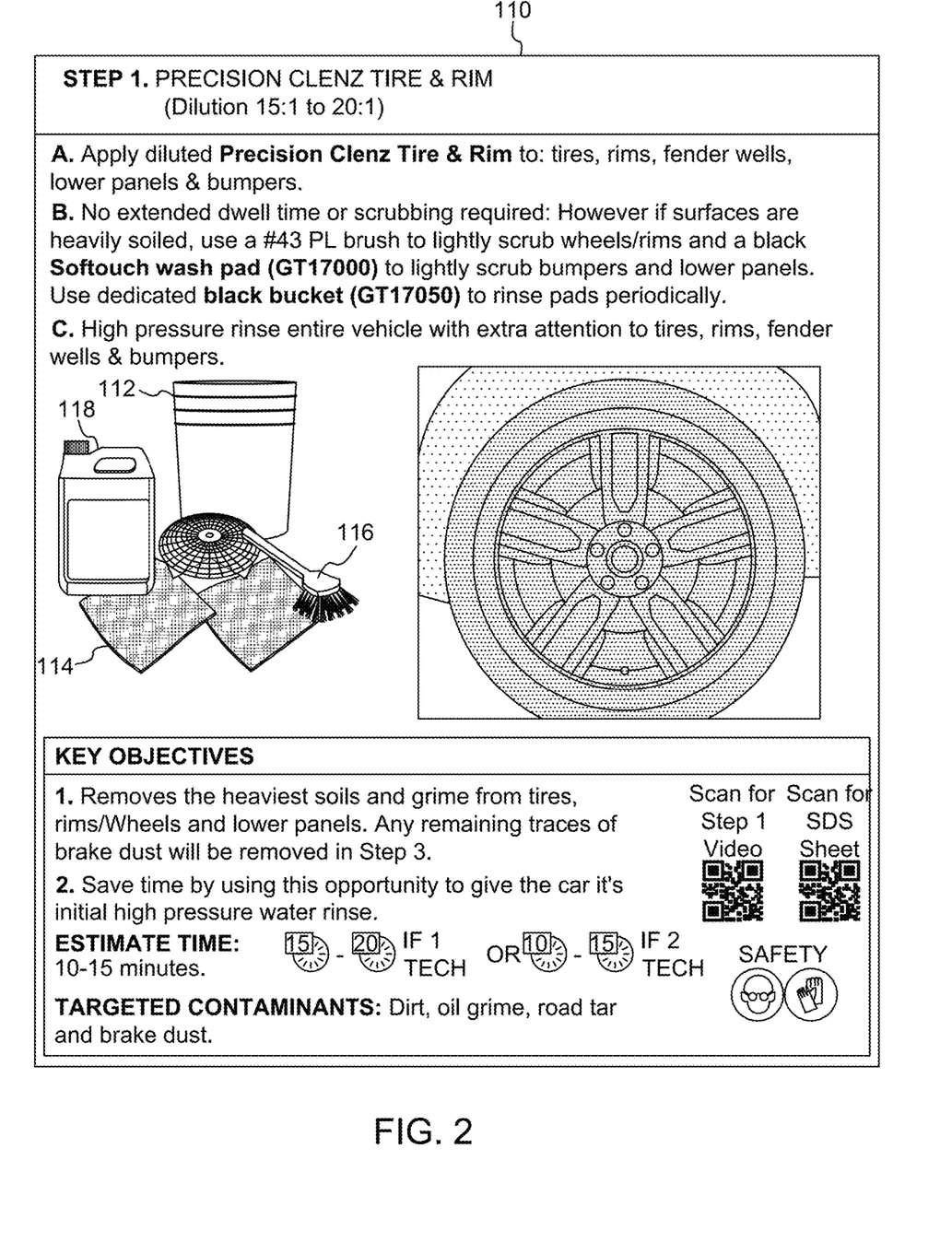
FIG. 2 shows a summary of the precision cleanse tire and rim step.

Application: The precision cleanse tire and rim cleaner may be applied to tires, rims, fender walls, lower panels, and bumpers using spraying or light touch application. For more soiled surfaces, the brushes or pads may be used to lightly scrub the areas. Following application for which no dwell time is required, the user rinses the entire vehicle with attention to the areas where the cleanse was applied.

The precision cleanse tire and rim cleaner bucket 112, mitt/pad/cloths 114, and optionally brushes or other cleaning aids 116 may be black or another color different from the similar supplies in the other steps. In FIG. 1, these supplies are generally designated with the number 115 but in FIG. 2, each of the supplies is called out with separate reference numbers. Labels for containers of the cleaning solutions 118 may be similarly colored to match the other supplies.

STEP 2: Precision cleanse high pH prep wash 120 (using a high pH, NaOH-based detergent, comparable to that which was used in Step one which incorporates a synergistic blend of chelate and surfactant chemistry)—See FIG. 3. This may be a required step and/or combined with Step 1 110. The chemistry of this product is a relatively high pH with ingredients geared towards the effective removal of greasy soils and films such as road film, hydrocarbon exhaust contamination, tree sap, bug residue and bird droppings from a vehicle exterior. The chemistry is designed to safely emulsify this category of contaminants in a manner far more effective than a low or neutral pH product.

Figure 3:
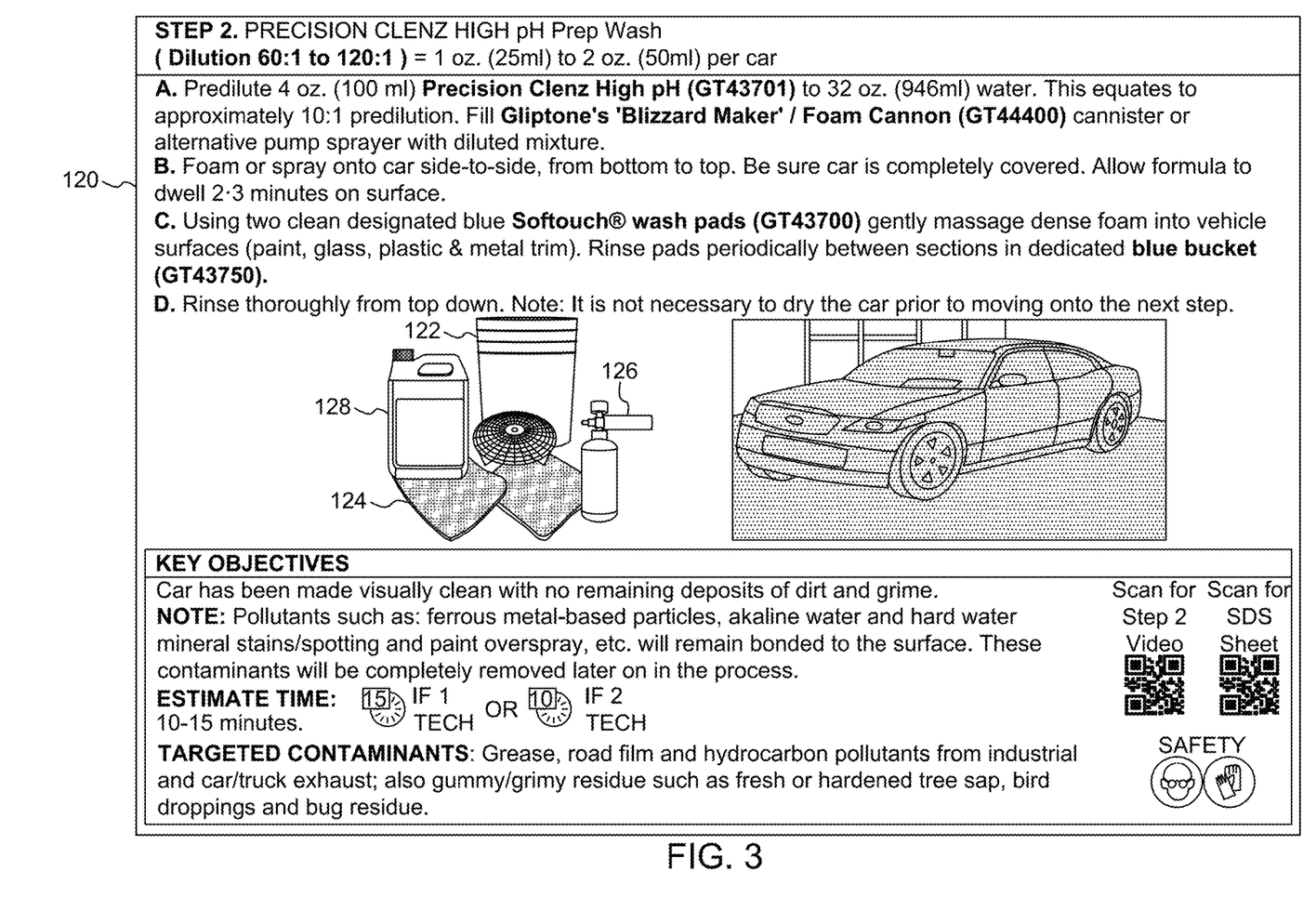
FIG. 3 shows a summary of the precision cleanse high pH prep wash step.

Since cross contamination with the chemistry associated with the precision cleanse low pH prep wash detergent could, to some extent, cause these two formulas to neutralize themselves, rendering them less effective, the system uses color coded buckets with matching color microfiber wash pads/mitts as shown.

It is possible, that for only moderate to mildly soiled tires and rims/wheels, to have STEP 1 skipped entirely and just give a scrub to the tires and rims/wheels here in this step, having first sprayed them with the precision cleanse tire and rim cleaner, or not, depending on soil levels.

Application: The precision high cleanse pH prep wash may be applied as a foam to the entire exterior surface of the vehicle after diluting 4 oz. of the wash into 32 oz of water. The application may be done using a foam cannon or other power sprayer that further dilutes the wash to a ratio of 60:1 to 120:1. The car is then rinsed. Drying is not necessary before moving on to the next step.

The precision cleanse high pH prep wash bucket 122, mitt/pad/cloths 124, and optionally brushes or other cleaning aids (foam cannon or pump sprayer as shown) 126 may be blue or another color different from the similar supplies in the other steps. In FIG. 1, these supplies are generally designated with the number 125 but in FIG. 3 each of these is called out with separate reference numbers. Labels for containers of the cleaning solutions 128 may be similarly colored to match the other supplies.

STEP 3: Iron cleaner 130 (using a mild, ammonia emitting, relatively pH neutral-acid solution)—see FIG. 4. This may also be a required feature. The chemistry of this product is designed to react with ferrous metal particles and dissolve them. The chemical reaction taking place between the ferrous metal-based contaminant and the formula causes the contaminant particle to change color to a purple-red, magenta. The reaction takes place over an average period of 2-5 minutes (with 2-3 being optimal) while the chemistry reacts with the ferrous-metal based pollutant.

Figure 4:
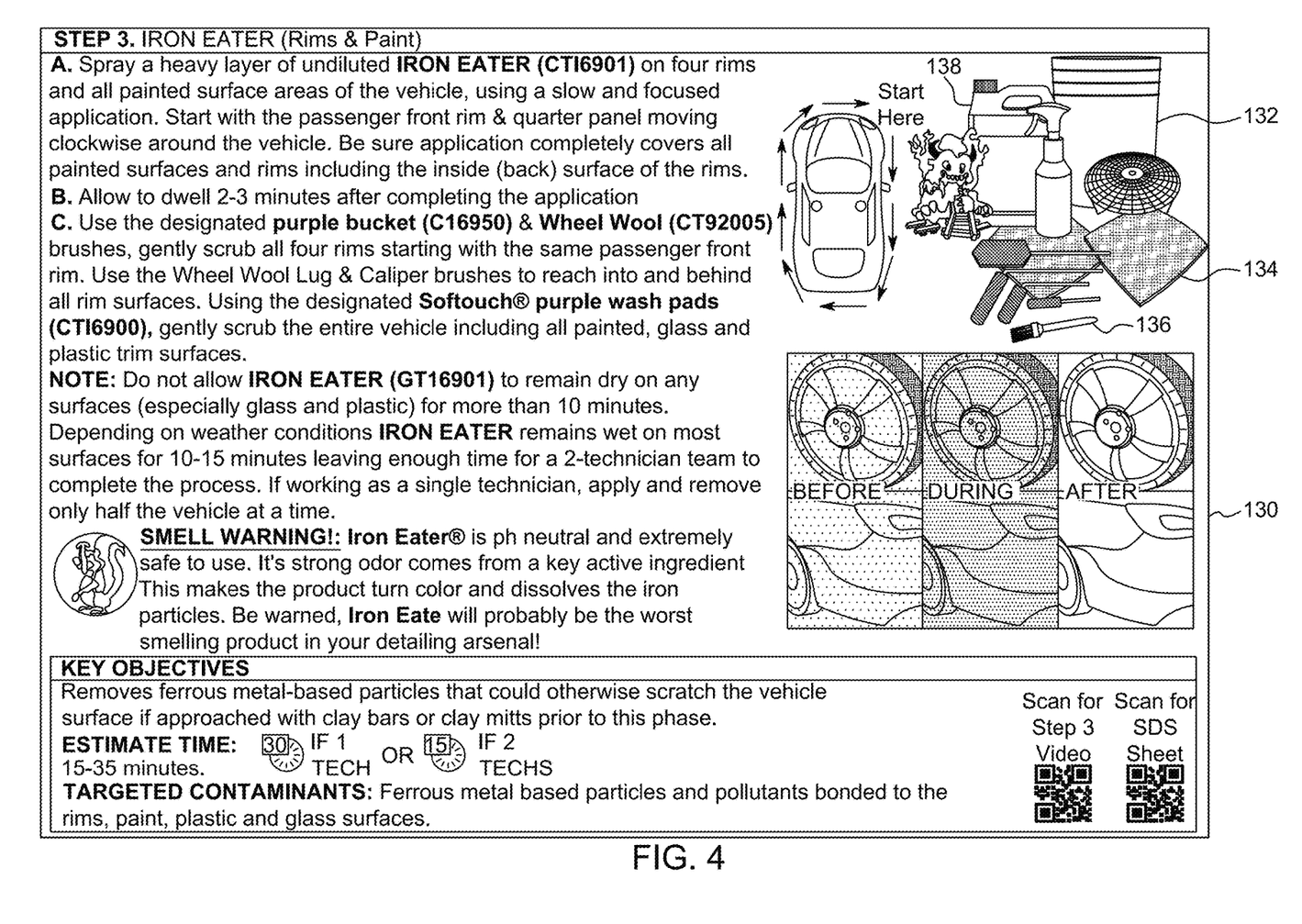
FIG. 4 shows a summary of the iron removal step.

Application: The iron cleaner may be applied to the rims using mitts or other brushes but for the lug and calipers, the wheel wool lug and caliper brushes 136 may be used. The soft mitts and pads 134 may be used on painted, glass, and trim surfaces. Once the reaction is completed the surface is rinsed thoroughly and the particles are removed.

The iron cleaner bucket 132, mitt/pad/cloths 134, and optionally brushes or other cleaning aids 136 may be purple or another color different from the similar supplies in the other steps. In FIG. 1, these supplies are generally designated with the number 135 but in FIG. 4 each of these is called out with separate reference numbers. Labels for containers of the cleaning solutions 138 may be similarly colored to match the other supplies.

STEP 4: Precision cleanse low pH Prep wash 140 (using a Low pH, phosphoric acid-based detergent that incorporates a blend of surfactant chemistry)—See FIG. 5. This may be a required feature. The chemistry of this product is a relatively Low pH (3-5), with ingredients geared towards the effective removal of mineral deposits/staining; ferrous metal particles, but to a lesser degree than what the iron cleaner provides; scale and mild rust; limescale; and detergent film mainly visible on chrome, metal, and glass surfaces, although present on most of the vehicle. The chemistry is designed to safely break down these compounds leaving a clear, residue finish. Since the mid-1990s Ford Motor Company has recommended a decontamination wash process that only used this type of chemistry followed by a neutral wash. The problem with that is that their singular, low pH wash step is not nearly strong enough to safely remove all the types of contaminations that are removed by the combination of the precision cleanse low pH prep wash and the iron cleaner. Saving labor time drying is another significant benefit of using low pH chemistry in the wash cycle because it aids in quickly shedding the water off the car, hence reducing the drying time.

Figure 5:
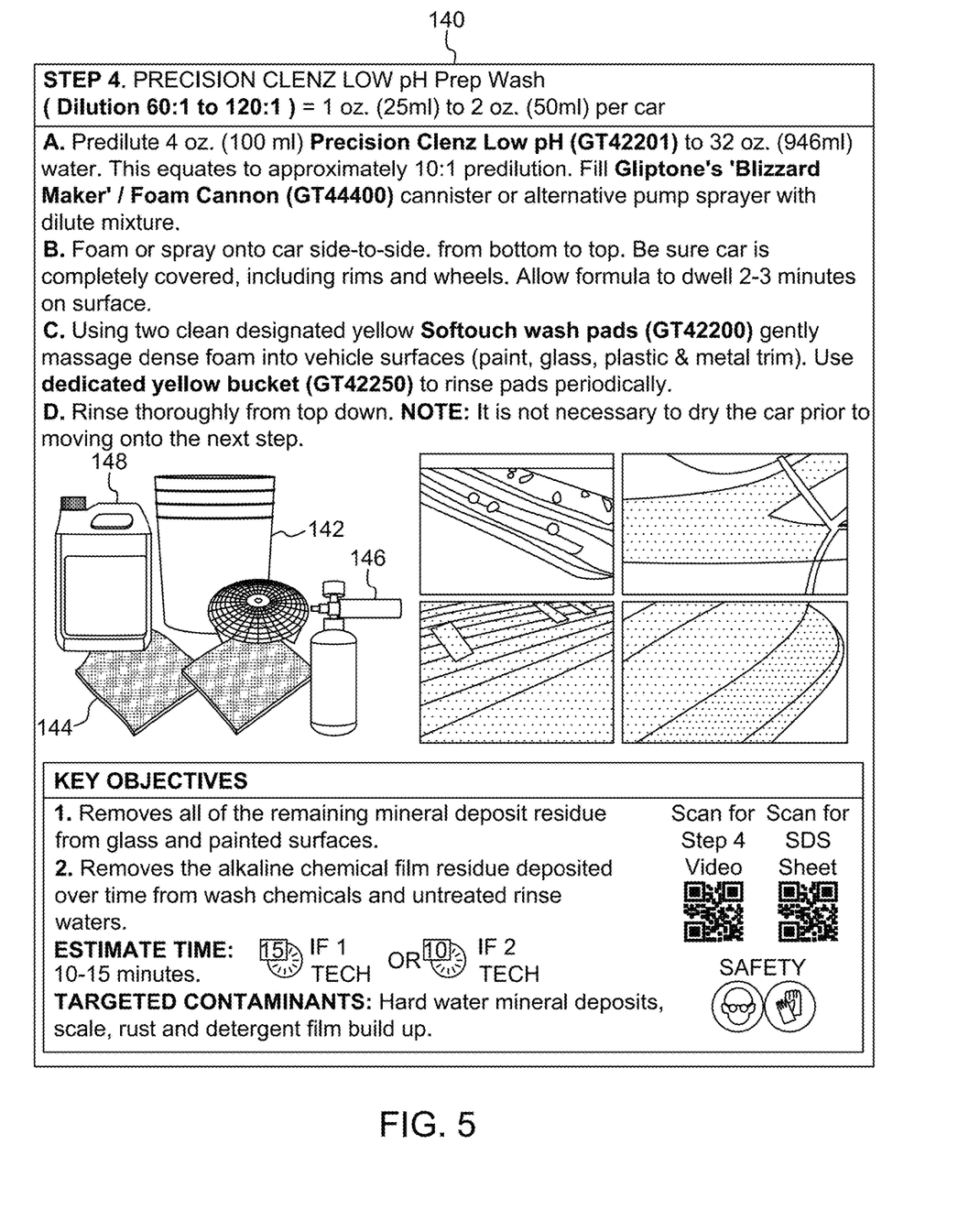
FIG. 5 shows a summary of the precision cleanse low pH prep wash step.

Here again, since cross contamination with the chemistry associated with the precision cleanse high pH prep wash detergent could, to some extent, cause these two formulas to neutralize themselves, rendering them less effective, the additional step of creating color coded buckets with matching color microfiber wash pads/mitts may be helpful.

Application: After diluting 4 oz. of the precision cleanse low pH into 32 ounces of water, the foam cannon or other power sprayer, which further dilutes the wash to a ratio of 60:1 to 120:1, is used to cover the entire vehicle. Next the user lightly the dense foam into the vehicle surfaces using pads 144, taking care to rinse them in the bucket 142 occasionally. Finally, the vehicle may be rinsed. Drying is not required before moving on to the next step.

The precision cleanse high pH prep wash bucket 142, mitt/pad/cloths 144, and optionally brushes or other cleaning aids (foam cannon or pump sprayer as shown) 146 may be yellow or another color different from the similar supplies in the other steps. In FIG. 1, these supplies are generally designated with the number 145 but in FIG. 5 each of these is called out with separate reference numbers. Labels for containers of the cleaning solutions 148 may be similarly colored to match the other supplies.

STEP 5: Body bar clay process 150 (using a clay type product)—see FIG. 6. This may be a required feature of the process and incorporates two products: a body bar 155 and a body lube spray 158 that is a silicone-free lubricant that enables the following product to work more efficiently by wetting the substrate and making it slippery so that the body bar 155 can glide along the surface, while the technician applies some pressure to the body bar material. As the body bar is rubbed (reciprocated) over all the car surfaces, it removes the embedded particles from the surface. The type of particles would include ferrous and non-ferrous metal-based particulate, paint overspray, hardened pine tar and tree sap, artillery fungi (mold spores), dried and hardened bird, bug and bee residue, industrial fallout/pollutants, etc. As each panel is cleared of debris, the bar is folded and stretched (similar to kneading dough), which yields fresh material, and the process continues until all the contaminants have been removed. The life expectancy of the body bar is dependent of the volume of debris is removes from the surfaces. If overused, the bar can become counterproductive in that it can begin to carve fine scratches into the surface.

Figure 6:
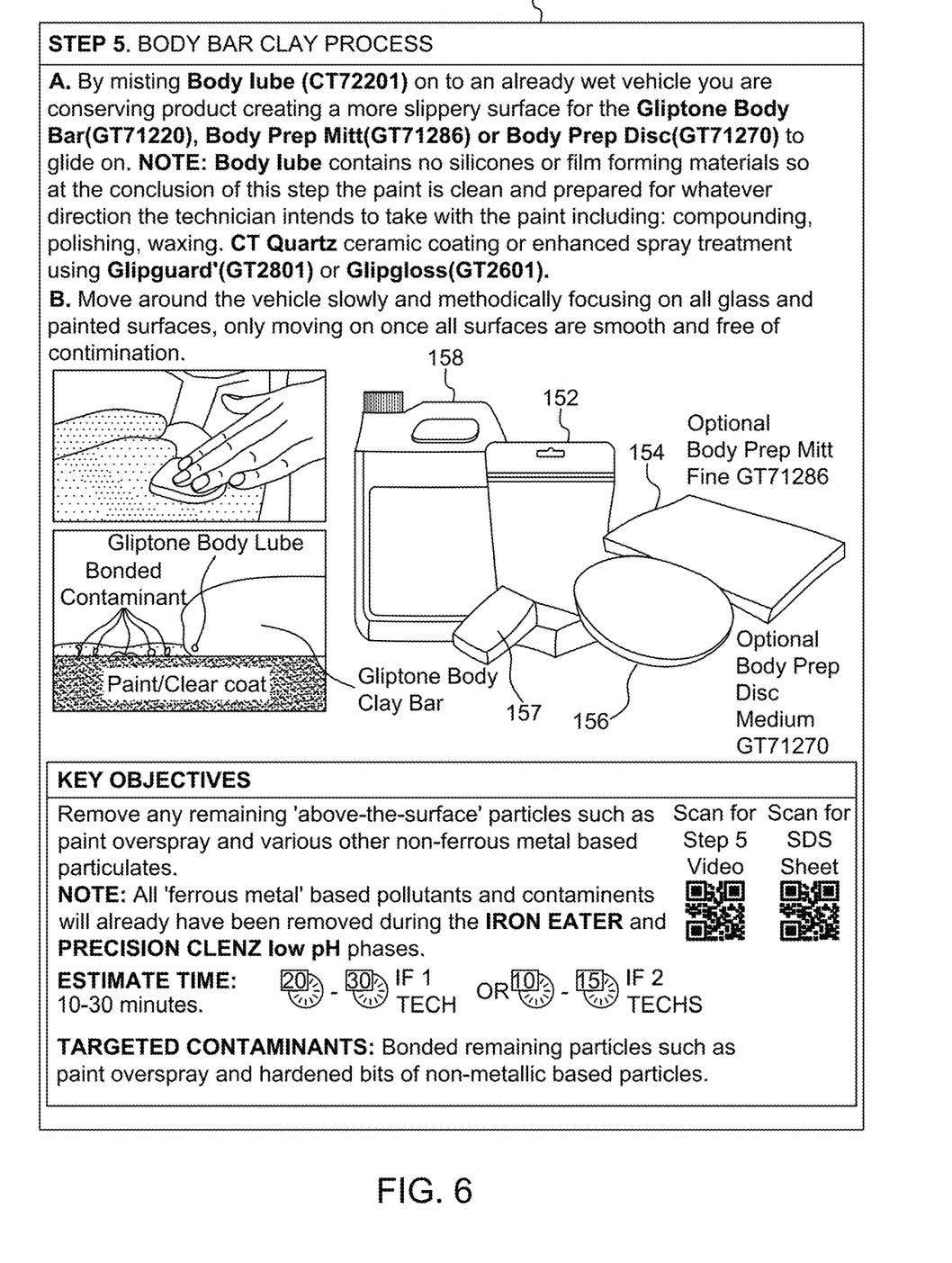
FIG. 6 shows a summary of the body bar clay process step.

The logic behind keeping this as the final step is this: Most contaminants have been removed prior to this step making this process far safer than it would traditionally be, from a reduced risk of scratching, perspective.

Some would argue that at this phase, "why bother" because the process has already removed the most prevalent contaminant (ferrous-based metal particles). Nothing in the process so far, however, removed embedded non-ferrous metal-based particulate, industrial fallout/pollutants, paint overspray and a limited amount of very tough, fiercely bonded hardened pine tar, tree sap, artillery fungi (mold spores), and dried/hardened bug residue.

Some would argue that the earlier Step 3, iron cleaner phase is unnecessary if one intends to use the body clay bar later in the process. The counter is that by doing the car surface wash down using the iron cleaner wash before this step, the process has now dissolved most if not all of the ferrous-metal-based particulate, which prolongs the life expectancy of my body bar and significantly reduces my chances of scratching the paint surface or other surfaces where the body bar is used.

Application: The technician may mist the body lube 158 onto the already wet vehicle. Then work the lube 156 using body bar 157, a disc 158, or mitt 154 focusing on glass and painted areas to remove any remaining contamination.

The body bar container 152, mitt/pad/cloths 154, and optionally brushes or other cleaning aids (disc cleaner) 158 may be grey or another color different from the similar supplies in the other steps. In FIG. 1, these supplies are generally designated with the number 155 but in FIG. 6 each of these is called out with separate reference numbers. Labels for containers of the lube solutions 156 may be similarly colored to match the other supplies. Note the body bar 157 itself is conveniently grey in color.

This 5-step system leaves all surfaces clean and contaminant free, but without any protection. An option of this system, geared primarily for new car dealers of domestic and imported cars, may use the modified system as a decontamination wash that will leave the car surface with 2-3 months of protection as that car sits in inventory. The changes to the current system would be as follows.

Save time on steps 1 and 2 by combining them. For example: It is reasonable to assume that the tires and rims of a brand-new car, just delivered to the dealership with little to no mileage, will be mostly clean so start the process at Step 2 and foam the car completely with precision cleanse high pH detergent; However, the process should include an additional application of diluted precision cleanse tire and rim detergent. This should prove to be more than adequate to rid the tires and rims of all the grime.

In this changed system to allow cars to sit in inventory, a spray lubricant like in the body bar step may include a sealant or other protection. This allows the car to sit in inventory with some protection.

The pH-neutral cleanse 165 noted with a separate color scheme from the other products (green for example) may be used as a rinse product for each step. Keeping the neutral buckets, pads, and other supplies clean of debris is critical to ensuring there is no contamination between steps.

While the invention has been described with reference to the embodiments above, a person of ordinary skill in the art would understand that various changes or modifications may be made thereto without departing from the scope of the claims.

The invention claimed is:

1. A method for washing a vehicle comprising the steps of:
   1) applying precision cleanse tire and rim cleanse 110 to the vehicle's tires and rims;
   2) applying precision cleanse high pH prep wash 120 to an exterior surface of the vehicle;
   3) applying iron cleaner 130 to the exterior surface of the vehicle;
   4) applying precision cleanse low pH prep wash 140 to the exterior surface of the vehicle;
   5) applying a precision body bar clay process 150 to the exterior surface of the vehicle.

2. The method of claim 1, wherein the precision cleanse tire and rim cleaner application uses supplies of a first color.

3. The method of claim 2, wherein the precision cleanse high pH prep wash uses supplies of a second color.

4. The method of claim 3, wherein the iron cleaner uses supplies of a third color.

5. The method of claim 4, wherein the precision cleanse low pH prep wash uses supplies of a fourth color.

6. The method of claim 5, wherein the body bar clay Process uses supplies of a fifth color.

7. The method of claim 5, wherein the supplies for each step are selected from a group consisting of: a bucket, a brush, a cleaning mitt, a cloth, and a sealable container.

8. The method of claim 1, wherein the steps are performed in the order listed.

9. The method of claim 1, wherein steps (1) and (2) are combined.

10. The method of claim 1, wherein step (1) precedes step (3).

11. The method of claim 1, wherein the precision cleanse tire and rim removes grease, grime, dirt and road film from tires and rims.

12. The method of claim 1, wherein the precision cleanse high pH prep wash removes greasy soils and films such as road film, hydrocarbon exhaust contamination, tree sap, bug residue, and bird droppings.

13. The method of claim 1, wherein the iron cleaner reacts with ferrous metal particles and dissolves the particles.

14. The method of claim 1, wherein the precision cleanse low pH prep wash removes mineral deposits/staining; ferrous metal particles, scale, mild rust, limescale, and detergent film mainly visible on chrome, metal, and glass surfaces.

15. The method of claim 1, wherein the body bar clay process removes embedded non-ferrous metal-based particulate, industrial fallout/pollutants, paint overspray and a limited amount of tough, bonded hardened pine tar, tree sap, artillery fungi (mold spores), and dried/hardened bug residue.

16. The method of claim 1, wherein before any step, a pH neutral body cleanse is applied after at least one of the steps.

17. The method of claim 16, wherein the pH-neutral body cleanse uses supplies of a sixth color.

* * * * *